(12) United States Patent
Arasan et al.

(10) Patent No.: US 10,471,876 B2
(45) Date of Patent: Nov. 12, 2019

(54) FOOT SUPPORT DEVICE OF A MOTOR VEHICLE

(71) Applicant: FORD GLOBAL TECHNOLOGIES, LLC, Dearborn, MI (US)

(72) Inventors: Mehmet Atay Arasan, Cologne (DE); Robin Oliver Dargel, Cologne (DE); Michael Malessa, Dormagen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/006,315

(22) Filed: Jun. 12, 2018

(65) Prior Publication Data
US 2018/0361900 A1 Dec. 20, 2018

(30) Foreign Application Priority Data
Jun. 14, 2017 (DE) .................. 10 2017 210 040

(51) Int. Cl.
*B60N 3/06* (2006.01)
(52) U.S. Cl.
CPC .............. *B60N 3/063* (2013.01); *B60N 3/066* (2013.01)
(58) Field of Classification Search
CPC .......... B60N 3/063; B60N 3/033; B60N 3/06; B60N 3/066
USPC .......................................................... 296/75
See application file for complete search history.

(56) References Cited

U.S. PATENT DOCUMENTS

| 826,862 | A | 7/1906 | Little |
| 4,984,838 | A | 1/1991 | Kim |
| 6,375,266 | B1 | 4/2002 | Ferguson et al. |
| 8,444,203 | B2 * | 5/2013 | Ohtsubo ............. B60N 2/0252 296/75 |
| 8,727,418 | B2 | 5/2014 | Miller |
| 8,770,616 | B1 | 7/2014 | Draper et al. |
| 2002/0096904 | A1 * | 7/2002 | Matsushita ............. B60N 3/06 296/75 |
| 2010/0230990 | A1 * | 9/2010 | Shukuri ................. B60N 3/066 296/75 |
| 2011/0233967 | A1 * | 9/2011 | Ohtsubo ................ B60N 2/067 296/193.07 |
| 2014/0292017 | A1 * | 10/2014 | Bouillon .................. B60N 3/06 296/37.14 |

FOREIGN PATENT DOCUMENTS

CN 205381175 U 7/2016

* cited by examiner

*Primary Examiner* — Jason S Morrow
(74) *Attorney, Agent, or Firm* — Brooks Kushman P.C.; Frank MacKenzie

(57) ABSTRACT

A foot support device of a vehicle has a foot support plate. The foot support plate is pivotably fitted to a foot space on a floor of the vehicle. A support device is arranged between a lower side of the foot support plate and the foot space on the floor, and contains at least one support element to introduce a force, which is applied to the foot support plate into the foot space on the floor. Via the at least one support element, below a predetermined force threshold value there is provided, for the force applied to the foot support plate, a force introduction path that, when the force threshold value is reached or exceeded, is substantially completely eliminated by reversible form change of the at least one support element.

17 Claims, 3 Drawing Sheets

This application claims foreign priority benefits under 35 U.S.C. § 119(a)-(d) to DE Application 10 2017 210 040.0 filed Jun. 14, 2017, which is hereby incorporated by reference in its entirety.

TECHNICAL FIELD

The disclosure relates to a foot support device pivotably fitted to a foot space floor of a vehicle.

BACKGROUND

For example, U.S. Pat. No. 826,862 A describes a releasable footrest for vehicles. The footrest can be releasably secured to a vehicle floor by angled members that are fitted to a first board. A second board that is movably connected to the first board by hinges can be adjusted with respect to a vehicle floor at different fixed angles by a curved member that is pivotably arranged on the second board being moved into engagement with different stops, which are securely connected to the first board by rails.

In order to increase the travel comfort, U.S. Pat. No. 4,984,838 A proposes a removable car floor mat with a removable footrest. The car mat for a floor position of a driver of a motor vehicle comprises a mat that is provided to be received in the floor region and is used by the feet of the driver of the motor vehicle. A footrest having an upper side and a lower side receives, at the upper side during use, a foot of the driver that is positioned with respect to an accelerator pedal of the motor vehicle in such a manner that the foot is supported above a floor of the motor vehicle at a height and angle that is close to a height and angle of the foot of the driver during operation of the accelerator pedal. A securing means secures the footrest to the mat and floor of the motor vehicle in a releasable and, at the same time, secure manner during use in order to prevent the mat from sliding along a surface of the floor of the motor vehicle.

U.S. Pat. No. 6,375,266 B1 describes a footrest having a disengagement device for a vehicle. The footrest is fitted to a frame of a front seat and is pivotably secured thereto in order to be able to be moved between a raised storage position that adjoins a rear side of the front seat and a lowered position to support feet of a vehicle passenger sitting on a rear seat. The footrest reacts to a force above a predetermined level with a disengagement device in order to prevent damage to the footrest, which can subsequently be returned to a position for use or the storage position. In a preferred embodiment, the footrest comprises a generally U-shaped element having an assembly retention device that contains a pivotable coupling with mutually opposing ends of the element in order to enable such a pivot movement. In addition, the assembly retention device and the U-shaped footrest comprise a resiliently deformable stop that extends between the two and retains the footrest in a position for use, which enables the footrest to be able to be pivoted downward if an excessive force is applied thereto.

Furthermore, in the field of vehicle technology it is also known, in the event of a front-end or lateral/frontal impact of vehicles, that a foot of a vehicle driver, which is normally placed on the footrest of the driver side, is often injured. For example, foot fractures can be brought about by a combined movement of a rotation of the foot and a support movement during an impact, particularly when the foot partially slides off the footrest as a result of acceleration forces during the impact.

U.S. Pat. No. 8,727,418 B2 proposes an energy-absorbing vehicle footrest and a method for providing an adaptable footrest. The energy-absorbing footrest comprises a foot support plate, a large number of pins that protrude from a lower side of the foot support plate and a support structure in which a large number of openings that can receive the large number of pins are arranged. Engagement between the pins and the support structure limits introduction of the large number of pins into the openings, and thereby supports the foot support plate in a raised position relative to the support structure until a predetermined force is applied to the foot support plate that brings about further introduction of the large number of pins into the large number of openings and a movement of the foot support plate in the direction of the support structure, wherein energy is absorbed in a permanent plastic deformation of the support structure.

CN 205381175 U describes a foot support plate and a car having such a foot support plate. The foot support plate comprises a main member having a folding structure, which is securely connected to a crumple zone structure of the vehicle in an instrument panel. In an event of an impact, the folding structure of the foot support plate becomes deformed, and a risk of injury with respect to the foot and leg that is supported on the foot support plate can be reduced.

U.S. Pat. No. 8,770,616 B1 describes a deployable foot support arrangement. The foot support arrangement comprises an upper plate that is actuated by an actuator so that the upper plate can be actuated between stored and deployed positions. During deployment, the upper plate is released from a housing by a locking mechanism being moved into an unlocked position. As soon as the upper plate is released from the housing, the actuator provides a linear support function for connection arms of a rod arrangement. In a state driven by the actuator, the connection arms rotate to a secure or adjusted position, whereby it is made possible for a vehicle passenger to use the arrangement as a deployed footrest. During storage, the locking mechanism is coupled to a storage mechanism in such a manner that, when the locking mechanism is actuated, the storage mechanism pulls the connection arms out beyond an adjusted locking threshold angle, whereby it is made possible for the upper plate to fold back into a storage position. The connection device is further provided to fold together under a load that is applied by a vehicle passenger to the upper plate during a collision and brings about a shearing of shearing bolts by which a folding-together action is enabled.

In view of the prior art set out, the field of footrests of vehicles still leaves room for improvement.

SUMMARY

An object of the disclosure is in particular to provide a foot support of a vehicle to reduce a risk of injury of a foot of a vehicle driver in an event of a front-end or side impact of the vehicle.

It should be noted that features and measures set out individually in the following description can be combined with each other in any technically advantageous manner and set out other embodiments of the disclosure. The description additionally characterizes and specifies the disclosure in particular in connection with the Figures.

The foot support device of a vehicle according to the disclosure has a foot support plate that can be pivotably fitted to a foot space on a floor of the vehicle. Furthermore, the foot support device contains a support device that is arranged between a lower side of the foot support plate and the foot space on the floor and has at least one support element to introduce a force that is applied to the foot support plate into the foot space on the floor.

According to the disclosure, via the at least one support element, below a predetermined force threshold value, there is provided for a force applied to the foot support plate, a force introduction path that, when the force threshold value is reached or exceeded, is substantially completely eliminated by a reversible form change of the at least one support element.

A "vehicle" is in the context of this disclosure intended to be understood to be in particular a passenger vehicle, a truck or a bus. The term "substantially completely eliminated" is intended in the context of the disclosure in particular to be understood to mean that the at least one support element in a relevant state provides a force introduction path that has less than 20%, preferably less than 15% and in a particularly preferred manner less than 10% of the force applied to the foot support plate introduced into the foot space on the floor.

In this manner, the force applied to the foot support plate when the force threshold value is reached or exceeded brings about a pivot movement of the foot support plate in a direction of the foot space on the floor so that the foot support plate is moved into a position in which the foot support plate is arranged substantially parallel with the foot space. A risk of injury to the foot of the vehicle driver in an event of a front-end or lateral/frontal impact of the vehicle is thereby reduced. In particular, injuries can be prevented, which occur as a result of a rotation movement of the foot under a mechanical load of an impact when the foot partially slides from the foot support plate.

If the force applied to the foot support plate after exceeding the force threshold value again falls to values below the force threshold value, the foot support plate is again moved by the at least one support element in a pivoting movement into a starting position and the force introduction path is provided again via the at least one support element.

In preferred embodiments of the foot support device, the at least one support element forms substantially a right-angle with a lower side of the foot support plate. The term "substantially a right-angle" is intended in the context of the disclosure to include, in particular, angles in a range between 70° and 110°, preferably between 75° and 105°, and in a particularly preferred manner between 80° and 100°. In this manner, the force applied to the foot support plate can be introduced in a particularly effective manner into the force introduction path provided by the at least one support element and in particular along an extension line of the at least one support element. Furthermore, an elimination of the force introduction path when the force threshold value is reached or exceeded can be achieved in a structurally particularly simple manner.

In advantageous embodiments of the foot support device, there is provided a spacer that, below the predetermined force threshold value, applies to the at least one support element a force that is directed perpendicularly to the force introduced by the foot support plate into the at least one support element in order to bring about a lateral pretensioning of the at least one support element, which pretensioning is defined with respect to direction and size. In this manner, it is possible for a reversible form change of the at least support element, when the force threshold value is reached, to be carried out in a predetermined direction.

Preferably, the force that is directed perpendicularly acts at a side of the at least one support element facing away from the lower side of the foot support plate. When the force threshold value is reached or exceeded, the reversible form change of the at least one support element can be carried out into a space below the lower side of the foot support plate so that the foot space outside the foot support device remains free from potentially disruptive components.

When there is provided a stop damping element that, when the force threshold value is reached or exceeded, mechanically damps and limits a pivot movement of the foot support plate, the pivot movement of the foot support plate can be cushioned in a direction of the foot space on the floor and an impact on the foot of the vehicle driver resting on the foot support plate can be reduced.

In preferred embodiments of the foot support device, the at least one support element is formed by a resilient rod that is secured at an upper end to the lower side of the foot support plate and can be fitted at a lower end to the foot space on the floor. In this manner, a structurally particularly simple solution for the at least one support element can be provided.

The predetermined force threshold value corresponds to a bending load of a resilient rod, known per se, when a pressure force acts in a direction of the rod axis. The bending load is dependent on an elasticity modulus of rod material, a geometry of the rod, an axial geometrical moment of inertia of the rod and a type of mechanical connection of the rod to the force introduced and force-dissipating components (so-called Euler buckling occurrences) and can consequently be configured accordingly in an appropriate manner.

Preferably, the resilient rod contains a thermoplastic plastics material, whereby a simple and cost-effective solution can be provided.

In advantageous embodiments, the resilient rod has an elliptical cross-sectional surface-area. In this instance, a long half-axis of the elliptical cross-sectional surface-area is arranged perpendicularly to a notional face that is defined by an extension line of the lower side of the foot support plate and a center line of the resilient rod. By increasing a strength of the at least one support element in directions that do not correspond to a predetermined direction of the reversible form change of the support element, a particularly reliable function of the foot support device can be achieved.

The term "elliptical cross-sectional surface-area" is intended to include in the context of the disclosure in particular a circular cross-sectional surface-area as a special case of an elliptical cross-sectional surface-area. The term "extension line" is intended in the context of the disclosure to be understood to be in particular a notional line that is arranged parallel with a provided orientation of the foot of the vehicle driver on the foot support plate.

In preferred embodiments of the foot support device, the at least one support element is formed by a resilient steel strip that is secured at an upper end to the lower side of the foot support plate and can be fitted at a lower end to the foot space on the floor. In this manner, a required strength can be provided by a particularly light construction of the at least one support element.

Preferably, the support element is constructed from resilient steel strip so as to be substantially rectangular. The term "substantially rectangular" is intended, in the context of this disclosure, in particular to be understood to mean that a deviation of a value of a surface of the support element from a value of a minimum rectangular shape that surrounds the support element is less than 20%, preferably less than 15% and, in a particularly preferred manner, less than 10%. A particularly simple production of the at least one support element can thereby be achieved.

In advantageous embodiments, the resilient steel strip has a cylindrical curvature below the predetermined force threshold value in a direction transverse relative to a notional connection line between the lower end and the upper end in a coherent region of an extension of the resilient steel strip. In this instance, a convex surface of the coherent region of the resilient steel strip faces the lower side of the foot support plate.

As a result of this shaping, with a same thickness of the resilient steel strip, a higher mechanical strength can be achieved so that a further weight saving can be achieved when the at least one support element is provided. When the force threshold value is reached or exceeded, the cylindrical curvature of the resilient steel strip is cancelled at least in a portion of the coherent region of the extension, and the reversible form change of the at least one support element contains a curvature of the resilient steel strip along the notional connection line between the lower end and the upper end. This means that the resilient steel strip in this embodiment after bending stretches again, in a similar manner to a pull-out tape measure, wherein an extension can always be achieved, regardless of a direction that the resilient steel strip bent. The foot support is thus virtually independently raised again.

Preferably, the resilient steel strip also has, in addition to the cylindrical curvature transversely relative to a direction of the extension in a coherent region of the extension thereof, a pretensioning in a direction of the extension that seeks to curve the resilient steel strip in a direction toward the lower side of the foot support plate. In this instance, this pretensioning below the predetermined force threshold value is overcompensated by a deformation resistance that exists as a result of the cylindrical curvature.

In this embodiment, the resilient steel strip has two stable positions. In one stable position, the resilient steel strip is curved in the extension direction thereof. When the resilient steel strip is stretched in the extension direction counter to a resilient force, a slight deformation transversely relative to the extension direction is sufficient to move the resilient steel strip into the other stable position in which the resilient steel strip has a cylindrical curvature transversely relative to the extension direction thereof.

When the force threshold value is reached or exceeded when the cylindrical curvature of the resilient steel strip is cancelled at least in a portion of the coherent region of the extension, the pretensioning in the direction of the extension supports the reversible form change of the resilient steel strip in the direction toward the lower side of the foot support plate, whereby an interruption of the force introduction path that is provided below the predetermined force threshold value is promoted. This means that the resilient steel strip in this embodiment, in a similar manner to a headband, virtually rolls up in one bending direction and extends in another bending direction. It is thus almost possible to adjust how the foot support is arranged after an overload occurrence. If the resilient steel strip is constructed with the pretensioning thereof in such a manner that, when the predetermined force threshold value is reached or exceeded, the pretensioning cancels the force introduction path by rolling up, the foot support is held down but can be raised again.

In advantageous embodiments of the foot support device, the at least one support element is formed by a molded component that is produced for the most part from a plastics soft foam material. The molded component contains, at an inner side, a large number of hollow spaces. The reversible form change when the force threshold value is reached or exceeded comprises a volume reduction of the large number of hollow spaces.

The term "for the most part" is in the context of the disclosure intended to be understood in particular to be a proportion of more than 50% by volume, preferably more than 60% by volume and, in a particularly preferred manner, more than 70% by volume. In particular the term is also intended to include the fact that the molded component may completely comprise, that is to say, at a rate of 100%, the plastics soft foam material.

Preferably, the at least one support element can be arranged between the lower side of the foot support plate and the foot space on the floor in such a manner that an upper side of the molded component is located in mechanical abutment with the lower side of the foot support plate and a lower side of the molded component can be brought into mechanical abutment with the foot space on the floor.

Other advantageous embodiments of the disclosure are disclosed in the dependent claims and the following description of the Figures, in which:

DETAILED DESCRIPTION

Figure 1:
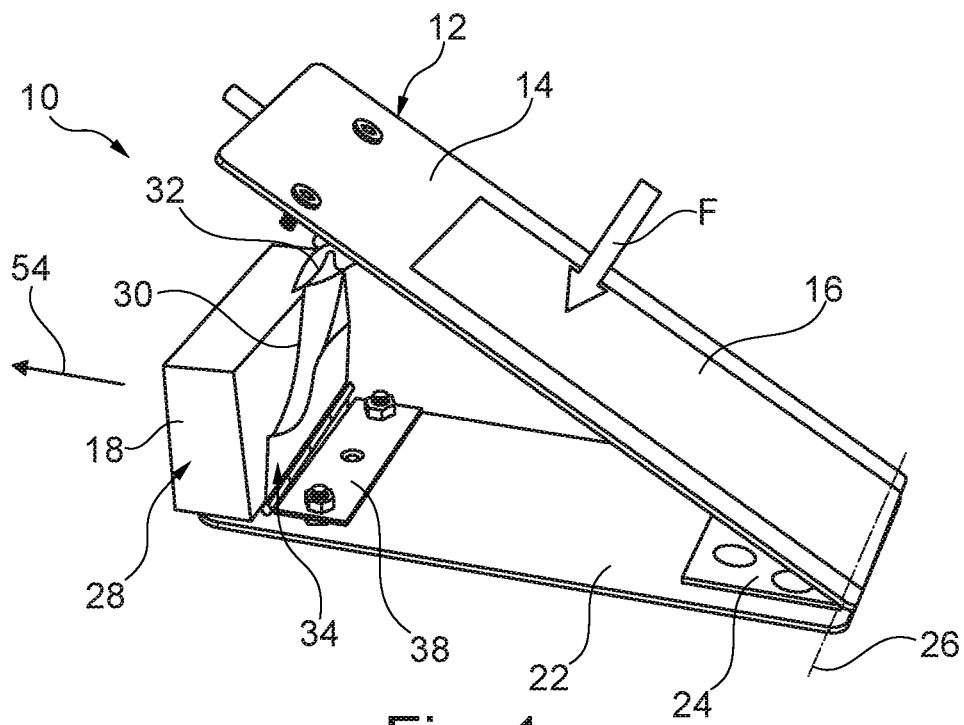
FIG. 1 is a perspective, schematic side view of a foot support device of a vehicle according to the disclosure in a state of a force applied to the foot support plate below a predetermined force threshold value.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different Figures, identical components are always given the same reference numerals, for which reason they are generally also only described once.

FIG. 1 is a perspective side view of a possible embodiment of a foot support device 10 of a vehicle according to the disclosure.

The foot support device 10 has a substantially rectangular foot support plate 12 that is pivotably fitted at a lower, shorter side by a hinge 24 to a foot space on a floor 22 of a vehicle, which is constructed as a passenger vehicle. The pivot axis 26 of the hinge 24 extends parallel with the foot space on the floor 22 and perpendicularly to a (forward) travel direction 54 of the vehicle. A possible pivot movement of the foot support plate 12 is limited in a direction of the foot space on the floor 22 by a stop damping element 18 of the foot support device 10, which element 18 is arranged perpendicularly on the foot space on the floor 22.

The foot support plate 12 has a lower side facing the foot space on the floor 22 and an upper side 14 that is arranged opposite. The upper side 14 is partially provided with a slip-resistant cover 16 that is intended to prevent sliding of a foot of a vehicle driver placed on the upper side 14 of the foot support plate 12.

Furthermore, the foot support device 10 has a support device 28 that is arranged between a lower side of the foot support plate 12 and the foot space on the floor 22. The support device 28 comprises a support element 30 to introduce a force F that is applied by the foot of the vehicle driver to the foot support plate 12 into the foot space on the floor 22.

The support element 30 is, for example, formed by a resilient steel strip 30 that substantially has a rectangular shape with a lower end 34, which is arranged close to the foot space on the floor 22 and an upper end 32, which is arranged close to the foot support plate 12. A notional connection line between the lower end 34 and the upper end 32 coincides with an unloaded state with a center line of a rectangular shape. The upper end 32 of the resilient steel strip 30 is secured to the lower side of the foot support plate 12 by any suitable receiving member. Such suitable receiving members are known to the person skilled in the art and therefore do not have to be explained in greater detail here. The lower end 34 of the resilient steel strip 30 is securely connected to a movable portion of an additional hinge 38. A second portion of the additional hinge 38 is releasably fitted securely by screw connections to the foot space on the floor 22.

FIG. 1 shows the foot support device 10 in a state in which the force F applied to the foot support plate 12 by the foot of the vehicle driver is below a predetermined force threshold value. In this specific embodiment, the force threshold value has a value of 600 N. In other embodiments, the foot support device 10 may be configured for another predetermined force threshold value.

In this state, a force introduction path for the force F applied to the foot support plate 12 is provided via the support element 30. The force F introduced is transmitted via the additional hinge 38 to the foot space on the floor 22.

As can best be seen in FIG. 2, the resilient steel strip 30 has, below the predetermined force threshold value in a direction transverse to the notional connection line between the lower end 34 and the upper end 32 in a coherent region of an extension, a cylindrical curvature 36 having a concave surface and a convex surface, wherein a notional cylinder axis of the cylindrical curvature 36 is arranged parallel with the connection line. The convex surface of the resilient steel strip 30 faces the lower side of the foot support plate 12.

Furthermore, the resilient steel strip 30 has, in an extension direction, a pretensioning that seeks to curve the resilient steel strip 30 in the direction toward the lower side of the foot support plate 12. In a state of the foot support device 10 illustrated in FIG. 1 below the predetermined force threshold value, pretensioning is overcompensated using a deformation resistance that exists as a result of the cylindrical curvature 36.

The support element 30 forms with the lower side of the foot support plate 12 substantially a right-angle (FIG. 1) so that introduction of the force F applied to the foot support plate 12 is carried out in a direction of the connection line between the lower end 34 and the upper end 32 of the resilient steel strip 30.

Figure 2:
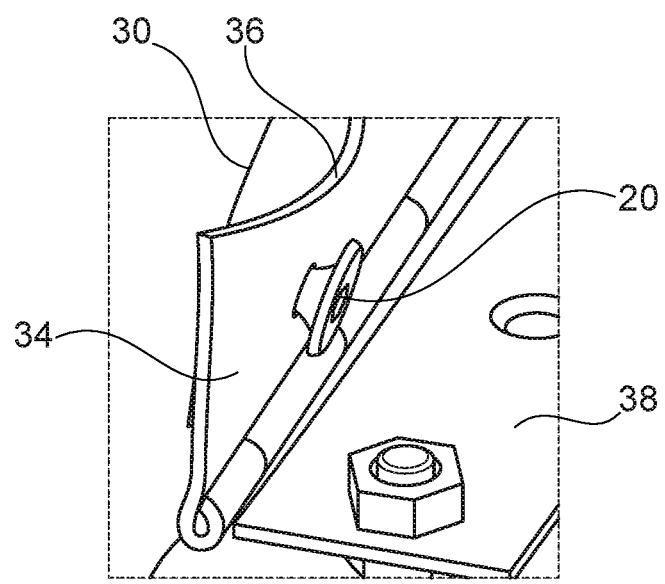
FIG. 2 is the same schematic illustration of a detail of the foot support device according to FIG. 1.

In a region close to the lower end 34 of the resilient steel strip 30, there is provided a spacer 20 (FIG. 2) that in the state illustrated in FIGS. 1 and 2 applies a force to the resilient steel strip 30 by being in mechanical abutment with the stop damping element 18 and pressing away from the stop damping element 18. This force is directed perpendicularly to the force F introduced via the foot support plate 12 into the resilient steel strip 30, and brings about a defined lateral pretensioning of the resilient steel strip 30, which pretensioning is directed toward the lower side of the foot support plate 12.

An increase of the force F applied by the foot of the vehicle driver to the foot support plate 12 is compensated for by the cylindrical curvature 36 of the resilient steel strip 30, wherein the cylindrical curvature 36 is reduced as a result of the force F applied (that is to say, the radius of curvature becomes greater). The support device 28 of the foot support device 10 nonetheless remains stable until the force threshold value is reached.

Figure 3:
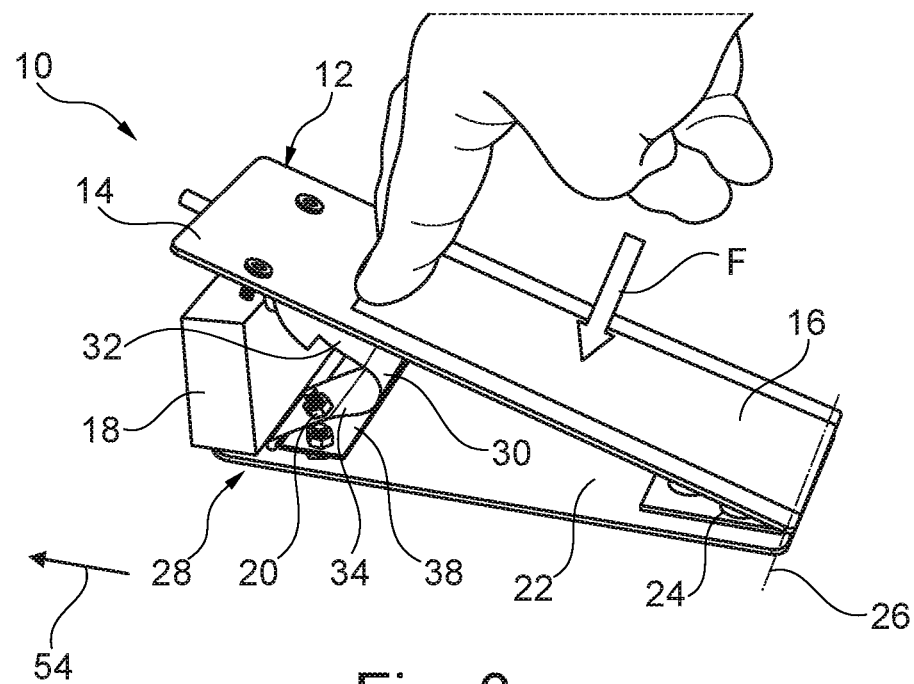
FIG. 3 is a perspective, schematic side view of the foot support device according to FIG. 1 in a state of a force applied to the foot support plate above the predetermined force threshold value.
Figure 4:
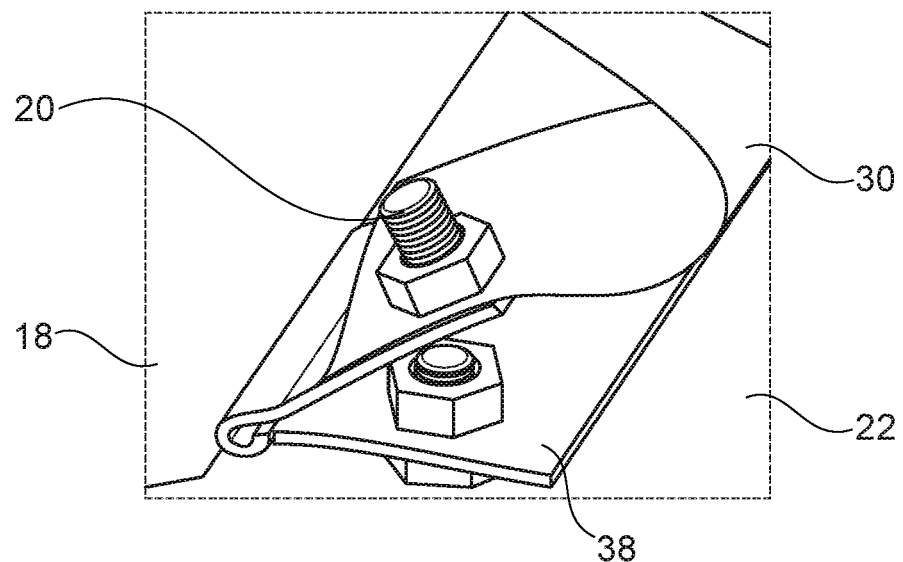
FIG. 4 is a schematic illustration that details the foot support device according to FIG. 1 in the same state and view as in FIG. 3.

As can be seen in FIG. 3, when the force threshold value is reached or exceeded, a resilient force of the resilient steel strip 30, as a result of the cylindrical curvature 36, is completely compensated by the force F applied to the foot support plate 12 at least in a portion of a coherent region of extension (FIG. 4). The force F applied by the foot of the vehicle driver to the foot support plate 12 and the pretensioning of the resilient steel strip 30 that seeks to curve the resilient steel strip 30 in the direction toward the lower side of the foot support plate 12 together result in the resilient steel strip 30, when the force threshold value is reached or exceeded, being reversibly deformed in the direction of the lower side of the foot support plate 12, and the previously existing force introduction path thereby is substantially completely eliminated.

The force F applied by the foot of the vehicle driver to the foot support plate 12 brings about, when the force threshold value is reached or exceeded, a pivot movement of the foot support plate 12 in the direction of the foot space on the floor 22, which is mechanically damped and limited by the stop damping element 18. The force F applied to the foot support plate 12 is introduced via the stop damping element 18 into the foot space on the floor 22.

If the force F applied to the foot support plate 12 after the force threshold value has been exceeded falls to values below the force threshold value, the foot support plate 12 is moved again by the resilient steel strip 30 in a pivoting movement into a starting position according to FIG. 1, and the force introduction path is provided again by the resilient steel strip 30.

Figure 5:
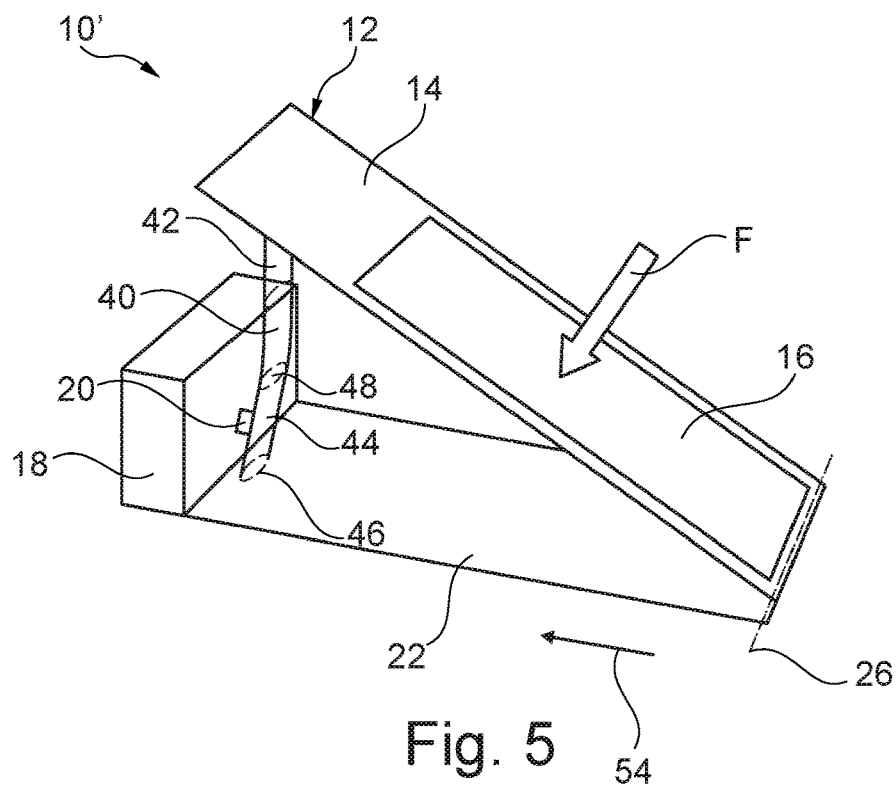
FIG. 5 is a perspective, schematic side view of an alternative foot support device of a vehicle according to the disclosure in a state of a force applied to the foot support plate below a predetermined force threshold value.

FIG. 5 is a schematic perspective side view of an alternative foot support device 10' of a vehicle according to the disclosure in a state of a force F applied to the foot support plate 12 below the predetermined force threshold value.

In order to avoid repetition, only differences of the alternative embodiment of the foot support device 10' with respect to the embodiment of the foot support device 10 according to FIGS. 1 to 4 are described below.

In the alternative embodiment of the foot support device 10', the support element is formed by a resilient rod 40 having an upper end 42 and a lower end 44 that completely comprises a thermoplastic plastics material. Securing of the upper end 42 to the lower side of the foot support plate 12 and fitting of the lower end 44 to the foot space on the floor 22 are carried out by appropriate receiving members that are known to the person skilled in the art and are not intended to be described in greater detail here.

The resilient rod 40 has throughout an elliptical cross-sectional surface-area 46. A long half-axis 48 of the elliptical cross-sectional surface-area 46 is arranged perpendicularly to a notional face that is defined by an extension line of the foot support plate 12 and a center line of the resilient rod 40. The operation of the resilient rod 40 corresponds to that of the resilient steel strip 30, and functions of the spacer 20 and the stop damping element 18 are maintained in an unmodified state.

Figure 6:
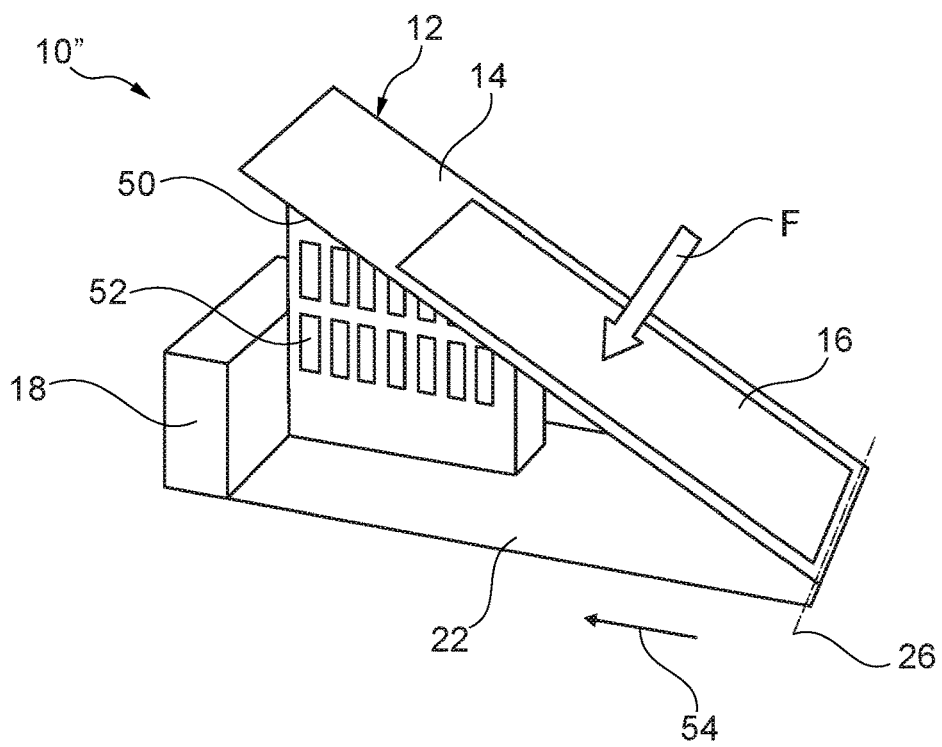
FIG. 6 is a schematic, perspective partially sectioned side view of another foot support device of a vehicle according to the disclosure in a state of a force applied to the foot support plate below a predetermined force threshold value.

FIG. 6 is a perspective, partially sectioned side view of another foot support device 10" of a vehicle according to the disclosure in a state of a force F applied to the foot support plate 12 below the predetermined force threshold value.

In the other embodiment of the foot support device 10" according to the embodiment in FIG. 6, the support element is formed by a molded component 50 that is produced for the most part from a plastics soft foam material, for example, at a rate of 100% from polyurethane (PUR) soft foam. However, in general, other plastics soft foam materials that appear suitable to the person skilled in the art may also be used to produce the molded component.

The molded component 50 is arranged between the lower side of the foot support plate 12 and the foot space on the floor 22 in such a manner that an upper side of the molded component 50, which is adapted to an inclination of the foot support plate 12, is in mechanical abutment with the lower side of the foot support plate 12, and a lower side of the molded component 50 is moved into mechanical abutment with the foot space on the floor 22. A side face that is arranged foremost in a travel direction 54 is in mechanical abutment with the stop damping element 18.

The molded component 50 is illustrated as a sectioned view in FIG. 6, wherein a plane of section is arranged perpendicularly to the foot space on the floor 22, and parallel with the extension line of the foot support plate 12. The molded component 50 contains, at an inner side, a large number of hollow spaces 52 that are spaced apart from each other in a uniform manner in two horizontal rows, parallel with the travel direction 54, wherein the two horizontal rows are arranged in a direction perpendicular to the foot space on the floor 22 with spacing one above the other. The reversible form change when the force threshold value is reached or exceeded comprises a volume reduction of the large number of hollow spaces 52.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle foot support device comprising:
   a plate pivotably fitted to a vehicle floor; and
   a support arranged between a lower side of the plate and the floor, having a support element that introduces a force applied to the plate into the floor via a force introduction path, wherein the force introduction path, if a force threshold value is reached or exceeded, is substantially completely eliminated by a reversible form change of the support element;
   wherein the support element is formed by a resilient rod secured at an upper end to the lower side of the plate and fitted at a lower end to the floor.

2. The vehicle foot support device as claimed in claim 1, wherein the support element forms substantially a right-angle with the lower side of the plate.

3. The vehicle foot support device as claimed in claim 1 further comprising a spacer that, below the force threshold value, applies a force to the support element directed perpendicularly to the force applied to the plate into the support element to laterally pretension the support element, wherein the lateral pretension is defined with respect to direction and size.

4. The vehicle foot support device as claimed in claim 1 further comprising a stop damping element that, when the force threshold value is reached or exceeded, mechanically damps and limits a pivot movement of the plate.

5. The vehicle foot support device as claimed in claim 1, wherein the resilient rod contains a thermoplastic plastics material.

6. The vehicle foot support device as claimed in claim 1, wherein the resilient rod has an elliptical cross-section surface-area such that a long half-axis of the elliptical cross-section surface-area is arranged perpendicularly to a notional face defined by an extension line of the lower side of the plate and a center line of the resilient rod, wherein the elliptical cross-section surface-area includes a circular cross-sectional surface-area.

7. A vehicle floor foot support comprising:
   a plate pivotably fitted to a vehicle floor;
   a support device arranged between a lower side of the plate and the floor, having a support element that introduces a first force applied to the plate into the floor, wherein a force introduction path, if a threshold value is reached or exceeded, is substantially, completely eliminated by reversible form change of the support element;
   a stop damping element that, when the threshold value is reached or exceeded, mechanically damps and limits a pivot movement of the plate; and
   a spacer element that, below the threshold value, applies a second force into the support element by being in mechanical abutment with the stop damping element and pressing away from the stop damping element, the second force being directed perpendicularly to the first force applied to the plate to laterally pretension the support element, wherein the lateral pretension is defined with respect to direction and size.

8. The vehicle floor foot support as claimed in claim 7, wherein the support element is formed by a resilient rod secured at an upper end to the lower side of the plate and at a lower end to the floor.

9. The vehicle floor foot support as claimed in claim 8, wherein the resilient rod contains a thermoplastic plastics material.

10. The vehicle floor foot support as claimed in claim 8, wherein the resilient rod has an elliptical cross-section surface-area such that a long, half-axis of the elliptical cross-section surface-area is arranged perpendicularly to a notional face defined by an extension line of the lower side of the plate and a center line of the resilient rod; wherein the elliptical cross-section surface-area includes a circular cross-sectional surface-area.

11. The vehicle floor foot support as claimed in claim 7, wherein the support element is formed by a resilient steel strip secured at an upper end to the lower side of the plate and fitted at a lower end to the floor.

12. The vehicle floor foot support as claimed in claim 11, wherein the steel strip has a cylindrical curvature below the threshold value in a direction arranged transversely relative to a notional connection line between an upper and lower end of the plate in a coherent region of an extension of the steel strip such that a convex surface of the coherent region faces the lower side of the plate.

13. The vehicle floor foot support as claimed in claim 12, wherein the steel strip has, in an extension direction, a pretensioning to curve the steel strip in a direction toward the lower side of the plate such that a deformation resistance, via the cylindrical curvature, overcompensates the pretensioning below the threshold value.

14. A vehicle foot support device comprising:
a plate pivotably fitted to a vehicle floor; and
a support arranged between a lower side of the plate and the floor, having a support element that introduces a force applied to the plate into the floor via a force introduction path, wherein the force introduction path, if a force threshold value is reached or exceeded, is substantially completely eliminated by a reversible form change of the support element;
wherein the support element is formed by a molded component produced from a plastics soft foam material such that the molded component contains, at an inner side, a number of hollow spaces and, when the force threshold value is reached or exceeded, has a volume reduction of the number of hollow spaces.

15. The vehicle foot support device as claimed in claim 14, wherein the support element forms substantially a right-angle with the lower side of the plate.

16. The vehicle foot support device as claimed in claim 14 further comprising a spacer that, below the force threshold value, applies a force to the support element directed perpendicularly to the force applied to the plate into the support element to laterally pretension the support element, wherein the lateral pretension is defined with respect to direction and size.

17. The vehicle foot support device as claimed in claim 14 further comprising a stop damping element that, when the force threshold value is reached or exceeded, mechanically damps and limits a pivot movement of the plate.

* * * * *